US012695117B2

(12) United States Patent
Yoshida

(10) Patent No.: US 12,695,117 B2
(45) Date of Patent: Jul. 28, 2026

(54) INORGANIC SOLID ELECTROLYTE MATERIAL, SOLID ELECTROLYTE, SOLID ELECTROLYTE MEMBRANE, AND LITHIUM ION BATTERY

(71) Applicant: FURUKAWA CO., LTD., Tokyo (JP)

(72) Inventor: Tatsushi Yoshida, Tsukuba (JP)

(73) Assignee: FURUKAWA CO., LTD., Tokyo (JP)

( * ) Notice: Subject to any disclaimer, the term of this patent is extended or adjusted under 35 U.S.C. 154(b) by 586 days.

(21) Appl. No.: 18/038,861

(22) PCT Filed: Nov. 12, 2021

(86) PCT No.: PCT/JP2021/041739
§ 371 (c)(1),
(2) Date: May 25, 2023

(87) PCT Pub. No.: WO2022/113782
PCT Pub. Date: Jun. 2, 2022

(65) Prior Publication Data
US 2024/0097183 A1 Mar. 21, 2024

(30) Foreign Application Priority Data
Nov. 30, 2020 (JP) ................................. 2020-197942

(51) Int. Cl.
*H01M 10/0562* (2010.01)
*H01B 1/10* (2006.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 10,763,542 B2 | 9/2020 | Meguro et al. | |
| 2017/0125842 A1* | 5/2017 | Meguro | .................. H01M 4/62 |
| 2019/0319302 A1 | 10/2019 | Kintsu | |
| 2020/0006808 A1* | 1/2020 | Utsuno | .................. H01B 13/00 |
| 2020/0251774 A1 | 8/2020 | Meguro et al. | |

(Continued)

FOREIGN PATENT DOCUMENTS

| | | |
|---|---|---|
| JP | 2012-129150 A | 7/2012 |
| JP | 2015-153466 A | 8/2015 |

(Continued)

OTHER PUBLICATIONS

English translation of JP 2019/186129 (Year: 2019).*

(Continued)

*Primary Examiner* — Yoshitoshi Takeuchi
(74) *Attorney, Agent, or Firm* — WHDA, LLP

(57) ABSTRACT

Provided is an inorganic solid electrolyte material including sulfide-based inorganic solid electrolyte particles. In a frequency distribution of circularity of the particles where the circularity of the particles in the material is plotted on a horizontal axis and a number-based frequency is plotted on a vertical axis, a 10% cumulative value $D_{10}$ is 0.54 to 0.80. In addition, a number-based median size $d_{50}$ of the particles in the material is 0.1 to 10 $\mu$m.

12 Claims, 1 Drawing Sheet

(56)        References Cited

U.S. PATENT DOCUMENTS

| | | | |
|---|---|---|---|
| 2021/0242496 A1* | 8/2021 | Shibata ................... | H01B 1/10 |
| 2023/0223594 A1 | 7/2023 | Shibata et al. | |

FOREIGN PATENT DOCUMENTS

| | | | | |
|---|---|---|---|---|
| JP | 5912550 | B2 | 4/2016 | |
| JP | 2019-186129 | A | 10/2019 | |
| JP | 2019186129 | * | 10/2019 | ........ H01M 10/0562 |
| JP | 6691481 | B2 | 4/2020 | |
| JP | 2020-126760 | A | 8/2020 | |
| KR | 20140025542 | A | 3/2014 | |
| WO | 2013/005085 | A1 | 1/2013 | |
| WO | 2016/017714 | A1 | 2/2016 | |
| WO | 2020/105736 | A1 | 5/2020 | |

OTHER PUBLICATIONS

International Search Report dated Jan. 18, 2022, issued in counterpart International Application No. PCT/JP2021/041739. (2 pages).

Office Action dated Nov. 19, 2024, issued in counterpart JP application No. 2022-565225, with English translation. (6 pages).

Office Action dated Mar. 29, 2025, issued in counterpart KR Application No. 10-2023-7020709 (7 pages).

Extended (Supplementary) European Search Report dated Apr. 23, 2024, issued in counterpart EP application No. 21897756.9. (7 pages).

* cited by examiner

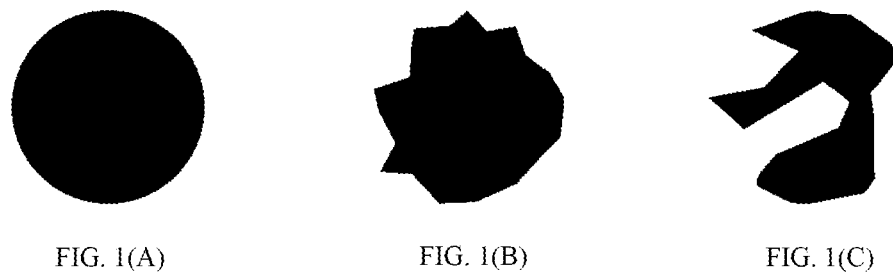
FIG. 1(A)         FIG. 1(B)         FIG. 1(C)
FIG. 2
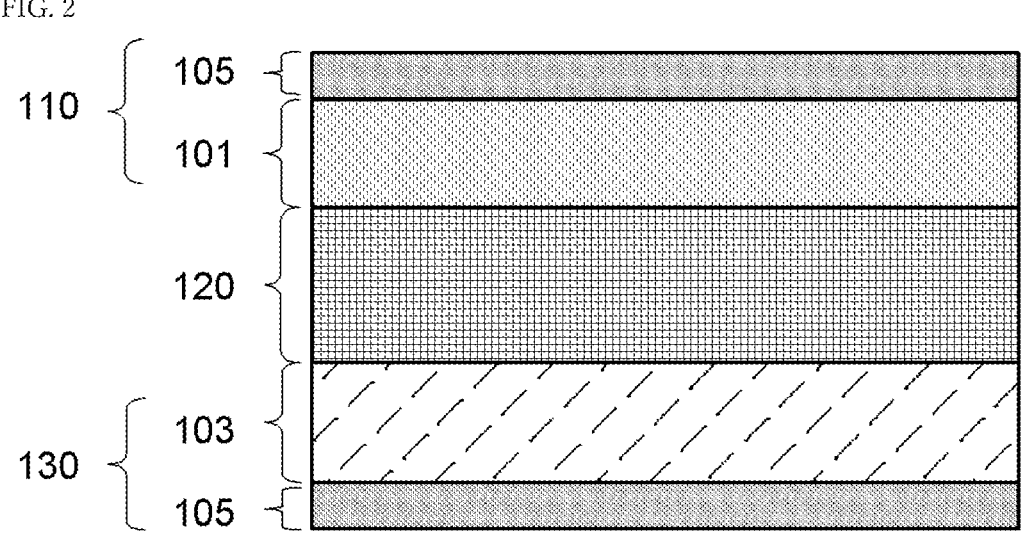
100

INORGANIC SOLID ELECTROLYTE MATERIAL, SOLID ELECTROLYTE, SOLID ELECTROLYTE MEMBRANE, AND LITHIUM ION BATTERY

TECHNICAL FIELD

The present invention relates to an inorganic solid electrolyte material, a solid electrolyte, a solid electrolyte membrane, and a lithium ion battery.

BACKGROUND ART

In general, a lithium ion battery is used as a power supply of a small mobile device such as a mobile phone or a laptop. In addition, recently, the lithium ion battery has been used not only as a power supply of a small mobile device but also as a power supply of an electric vehicle, an electric power storage, or the like.

In a currently commercially available lithium ion battery, an electrolytic solution including a combustible organic solvent is used.

On the other hand, an investigation on a lithium ion battery (hereinafter, also referred to as "all-solid-state lithium ion battery") in which the electrolytic solution is replaced with a solid electrolyte such that the entire battery is made of a solid has progressed. The all-solid-state lithium ion battery does not include a combustible organic solvent. Therefore, it is considered that a safety device can be simplified and manufacturing costs or productivity is excellent.

As a solid electrolyte material used for the solid electrolyte, for example, an inorganic solid electrolyte material is known.

Examples of a technique in the related art of the solid electrolyte material include a technique described in Patent Document 1. Patent Document 1 describes sulfide-based inorganic solid electrolyte particles that satisfy all of the following various elements A.

<Various Elements A>

A perimeter of a projected particle of an inorganic solid electrolyte particle is represented by L.

A cross-sectional area of the projected particle of the inorganic solid electrolyte particle is represented by A.

An unevenness coefficient FU represented by Expression (1) below is in a range of 0.85 or more and 1 or less.

$$FU = 4\pi A/L^2 \qquad (1)$$

RELATED DOCUMENT

Patent Document

[Patent Document 1] Japanese Patent No. 6691481

SUMMARY OF THE INVENTION

Technical Problem

One performance required for the solid electrolyte material is high ionic conductivity.

According to findings of the present inventors, regarding the sulfide-based inorganic solid electrolyte particles described in Patent Document 1, there is room for improvement of ionic conductivity.

The present invention has been made under these circumstances. One object of the present invention is to provide sulfide-based inorganic solid electrolyte particles having a high ionic conductivity.

Solution to Problem

The present inventors completed the present invention provided below and achieved the above-described object.

According to the present invention, there is provided an inorganic solid electrolyte material including sulfide-based inorganic solid electrolyte particles, in which in a frequency distribution of circularity of the particles where the circularity of the particles in the material is plotted on a horizontal axis and a number-based frequency is plotted on a vertical axis, a 10% cumulative value $D_{10}$ is 0.54 to 0.80, and a number-based median size $d_{50}$ of the particles in the material is 0.1 to 10 µm.

In addition, according to the present invention, there is provided a solid electrolyte including the above-described inorganic solid electrolyte material.

In addition, according to the present invention, there is provided a solid electrolyte membrane including the above-described solid electrolyte as a main component.

In addition, according to the present invention, there is provided a lithium ion battery including:

a positive electrode including a positive electrode active material layer;

an electrolyte layer; and a negative electrode including a negative electrode active material layer, in which at least one of the positive electrode active material layer, the electrolyte layer, and the negative electrode active material layer includes the above-described sulfide-based inorganic solid electrolyte material.

Advantageous Effects of Invention

According to the present invention, a sulfide-based inorganic solid electrolyte particle having a high ionic conductivity is provided.

BRIEF DESCRIPTION OF THE DRAWINGS

FIG. 1(A) to FIG. 1(C) are supplementary diagrams intuitively showing a concept of "circularity".

FIG. 2 is a cross-sectional view showing an example of a structure of a lithium ion battery.

DESCRIPTION OF EMBODIMENTS

Hereinafter, embodiments of the present invention will be described in detail with reference to the drawings.

All the drawings are merely illustrative. A shape, a dimensional ratio, and the like shown in the drawings do not necessarily correspond to those of an actual article.

In the present specification, the expression "X to Y" in the description of a numerical range represents X or more and Y or less unless specified otherwise. For example, "1 to 5 mass %" represents "1 mass % or more and 5 mass % or less".

The expression "(meth)acryl" in the present specification represents a concept including acryl and methacryl. The same shall be applied to similar expressions such as "(meth) acrylate".

Hereinafter, sulfide-based inorganic solid electrolyte particles will also be simply referred to as "particles".

<Inorganic Solid Electrolyte Material>

An inorganic solid electrolyte material according to an embodiment includes sulfide-based inorganic solid electrolyte particles.

In a frequency distribution of circularity of the sulfide-based inorganic solid electrolyte particles where the circularity of the particles in the material is plotted on a horizontal axis and a number-based frequency is plotted on a vertical axis, a 10% cumulative value $D_{10}$ is 0.54 to 0.80.

In addition, a number-based median size $d_{50}$ of the sulfide-based inorganic solid electrolyte particles in the material is 0.1 to 10 μm.

"Circularity" is an index representing distortion/deformation of a figure from a true circle.

When the area of the figure is represented by S, the perimeter is represented by L, and the Pi is represented by π, the circularity is represented by $4\pi S/L^2$.

When the figure has a shape close to a true circle, the circularity approaches 1. When the shape of the figure is complicated, the circularity decreases away from 1.

FIG. 1(A) to FIG. 1(C) are supplementary diagrams intuitively showing a concept of the circularity. The circularity of a figure in FIG. 1(A) is substantially 1. The circularity of a figure in FIG. 1(B) is about 0.7. The circularity of a figure in FIG. 1(C) is about 0.25. It is understood from the results that: as the circularity of a figure becomes closer to 1, the figure has a contour close to a true circle; and as the circularity of a figure decreases, the figure has a contour deformed from a true circle.

The present inventors investigated improvement of the inorganic solid electrolyte material from various viewpoints. Through the investigation, the present inventors thought that any index regarding the shape of the sulfide-based inorganic solid electrolyte particles relates to ionic conductivity.

Based on this finding, the present inventors conducted a further investigation. Specifically, "as any index regarding the shape of the sulfide-based inorganic solid electrolyte particles", the circularity that is an index representing distortion/deformation of a figure from a true circle was investigated. In addition, the inorganic solid electrolyte material is "aggregate" of a plurality of sulfide-based inorganic solid electrolyte particles. Therefore, the present inventors thought that, by appropriately designing "distribution" of the circularity of the particles, the ionic conductivity can be improved.

Based on this thought, the present inventors conducted a further investigation. The present inventors found that, in an inorganic solid electrolyte material including sulfide-based inorganic solid electrolyte particles, the ionic conductivity can be improved by designing the material such that, in a frequency distribution of circularity of the sulfide-based inorganic solid electrolyte particles where the circularity of the particles is plotted on a horizontal axis and a number-based frequency is plotted on a vertical axis, a 10% cumulative value $D_{10}$ is 0.54 to 0.80.

The reason why the ionic conductivity is improved by adjusting $D_{10}$ to 0.54 to 0.80 can be described as follows.

$D_{10}$ being 0.54 or more represents that the number of deformed particles in the group of particles is extremely small. It is considered that, when the number of deformed particles is extremely small, "gaps" between the particles decrease such that the ionic conductivity is improved.

In addition, $D_{10}$ being 0.80 or less represents that the number of particles having a shape close to a true circle is not excessively large such that "somewhat deformed" particles in the group of particles account for a certain proportion. When the shape of particles is close to a true circle, contact between the particles is "point-like" such that the ionic conductivity may decrease. Therefore, it is considered that $D_{10}$ is preferably 0.80 or less.

Further, in the present embodiment, a number-based median size $d_{50}$ of the particles is 0.1 to 10 μm. This configuration represents that the particles are "not excessively large and not excessively small". It is considered that, when the number of deformed particles is not extremely large, "gaps" between the particles decrease such that the ionic conductivity is improved. It is considered that, when the number of deformed particles is not extremely small, the area of contact surfaces between the particles decreases such that the ionic conductivity is improved.

Incidentally, it is considered that "unevenness coefficient" described in Patent Document 1 is equivalent to the circularity. However, Patent Document 1 does not describe "distribution" of circularity of the electrolyte particles, and does not also describe $D_{10}$. Focusing on the frequency distribution of circularity of the electrolyte particles, the idea that the electrolyte particles are designed such that $D_{10}$ is 0.54 to 0.80 and the idea that the diameter of the electrolyte particles is optimized depending on the circularity are unique ideas of the present inventors.

In order to manufacture the inorganic solid electrolyte material according to the present embodiment ($D_{10}$ is 0.54 to 0.80), it is preferable to use an appropriate material and to select appropriate manufacturing conditions. In order to manufacture the inorganic solid electrolyte material according to the present embodiment, for example, it is preferable (i) to change the shape of particles of an inorganic solid electrolyte material in a vitreous state by performing a ball mill treatment under appropriate conditions and/or (ii) to perform an appropriate sieving operation. Unless an appropriate manufacturing method and manufacturing conditions are selected, there is a case where the inorganic solid electrolyte material according to the present embodiment cannot be obtained.

A specific method of manufacturing the inorganic solid electrolyte material according to the present embodiment will be described below.

The description regarding the inorganic solid electrolyte material according to the present embodiment is continued.

(Frequency Distribution of Sulfide-Based Inorganic Solid Electrolyte Particle)

As described above, $D_{10}$ may be 0.54 to 0.80. From the viewpoint of further increasing the ionic conductivity, it is more preferable that $D_{10}$ is 0.60 to 0.75.

In the present embodiment, by setting a 50% cumulative value $D_{50}$ in the frequency distribution of circularity of the particles to an appropriate value in addition to $D_{10}$, there may be a case where the ionic conductivity can be further increased. Specifically, $D_{50}$ is preferably less than 0.85, more preferably 0.70 to 0.84, and still more preferably 0.75 to 0.82.

It is considered that $D_{50}$ being less than 0.85 is similar to $D_{10}$ being 0.80 or less and represents that a group of particles includes a certain amount of deformed particles. That is, it is considered that, when $D_{50}$ is less than 0.85, the contact area between the particles is likely to increase such that the ionic conductivity is further improved.

On the other hand, it is considered that, when $D_5a$ is 0.70 or more, gaps between the particles further decrease such that the ionic conductivity is further increased.

In addition, in the present embodiment, even by setting a 90% cumulative value $D_{90}$ in the frequency distribution of circularity of the particles to an appropriate value, there may be a case where the ionic conductivity can be further increased. Specifically, $D_{90}$ is preferably 0.95 or less, more preferably 0.85 to 0.95, and still more preferably 0.87 to 0.92.

It is considered that $D_{90}$ being 0.95 or less also represents that a group of particles includes a certain amount of deformed particles. That is, it is considered that, when $D_{10}$ is 0.95 or less, the contact area between the particles is likely to increase such that the ionic conductivity is further improved.

On the other hand, it is considered that, when $D_{90}$ is 0.85 or more, gaps between the particles further decrease such that the ionic conductivity is further increased.

In the present embodiment, by appropriately designing the value of $(D_{90}-D_{10})/D_{50}$, there may be a case where the ionic conductivity can be further increased. Specifically, $(D_{90}-D_{10})/D_{50}$ is preferably 0.10 to 0.45 and more preferably 0.20 to 0.45.

The index $(D_{90}-D_{10})/D_{50}$ represents the broadness/sharpness of the frequency distribution. As the value decreases, the frequency distribution becomes sharper, the particles are relatively uniform in terms of the circularity, and the number of particles having an extremely large or small circularity is relatively small. In addition, as the value increases, the frequency distribution becomes broader, and the proportion of particles having a circularity that deviates from an average circularity (particles having a relatively large circularity or particles having a relatively small circularity) in a group of particles is relatively large.

It is considered that, when $(D_{90}-D_{10})/D_{50}$ is 0.10 or more, that is, when the frequency distribution is appropriately broad and the proportion of particles having a circularity that deviates from the average circularity in a group of particles is at a certain level, gaps between the particles further decrease as a whole of the group of the particles or the contact area further increases such that the ionic conductivity is further improved.

It is considered that, when $(D_{90}-D_{10})/D_{50}$ is 0.45 or less, that is, when the frequency distribution is appropriately sharp and the number of particles having an extremely large or small circularity is relatively small, gaps between the particles where the ionic conductivity is likely to decrease is not likely to be formed such that the ionic conductivity is further improved.

The frequency distribution of circularity of the particles can be obtained, for example, through the following procedures including: (1) imaging the particles with an electron microscope; (2) obtaining the circularity of each of the particles from the area and the perimeter of each of the particles in the obtained image; and (3) plotting the circularity of each of the particles on the horizontal axis and plotting the number-based frequency on the vertical axis. A specific example of the method of obtaining the frequency distribution will be described with reference to the description of Examples.

(Constituent Element and Composition Thereof)

It is preferable that the inorganic solid electrolyte material according to the present embodiment includes Li, P, and S as constituent elements from the viewpoint of electrochemical stability, stability in water or air, handling properties, and the like.

In addition, in the inorganic solid electrolyte material according to the present embodiment, from the viewpoint of further improving lithium ionic conductivity, electrochemical stability, stability in water or air, handling properties, and the like, a molar ratio Li/P of the content of Li to the content of P in the inorganic solid electrolyte material is preferably 1.0 or higher and 5.0 or lower, more preferably 2.0 or higher and 4.0 or lower, still more preferably 2.5 or higher and 3.8 or lower, still more preferably 2.8 or higher and 3.6 or lower, still more preferably 3.0 or higher and 3.5 or lower, still more preferably 3.1 or higher and 3.4 or lower, and still more preferably 3.1 or higher and 3.3 or lower.

In addition, a molar ratio S/P of the content of S to the content of P is preferably 2.0 or higher and 6.0 or lower, more preferably 3.0 or higher and 5.0 or lower, still more preferably 3.5 or higher and 4.5 or lower, still more preferably 3.8 or higher and 4.2 or lower, still more preferably 3.9 or higher and 4.1 or lower, and still more preferably 4.0.

The contents of Li, P, and S in the inorganic solid electrolyte material can be obtained by, for example, ICP Emission Spectroscopy or X-ray analysis.

(Regarding Particle Size Distribution)

In the present embodiment, by appropriately designing a particle size distribution in addition to the distribution of circularity of the particles, the ionic conductivity can be further improved.

As described above, in the present embodiment, the number-based median size $d_{50}$ is 0.1 to 10 μm and preferably 0.1 to 6.0 μm. It is considered that, when $d_{50}$ is appropriately large, the contact surface (interface) between the particles decreases such that higher ionic conductivity can be obtained. In addition, it is considered that, when $d_{50}$ is not excessively large, gaps between the particles are not likely to be formed such that higher ionic conductivity can be obtained.

In addition, by appropriately designing the 10% cumulative value $d_{10}$ in the number-based particle distribution, there may be a case where the ionic conductivity can be further improved. Specifically, $d_{10}$ is preferably 0.05 to 5.0 μm and more preferably 0.5 to 3.0 μm. $d_{10}$ being appropriately large represents that the number of excessively fine particles is small. It is considered that, when the number of excessively fine particles is small, the contact surface (interface) between the particles decreases such that higher ionic conductivity can be obtained. In addition, it is considered that, when $d_{10}$ is not excessively large, gaps between the particles are not likely to be formed such that higher ionic conductivity can be obtained.

Further, by appropriately designing the 90% cumulative value $d_{90}$ in the number-based particle distribution, there may be a case where the ionic conductivity can be further improved. Specifically, $d_{90}$ is preferably 2.0 to 20.0 μm and more preferably 2.0 to 10.0 μm. It is considered that, when $d_{90}$ is not excessively large, gaps between the particles are not likely to be formed such that higher ionic conductivity can be obtained. In addition, it is considered that, when $d_{90}$ is appropriately large, the contact surface (interface) between the particles decreases such that higher ionic conductivity can be obtained.

From a viewpoint other than ionic conductivity, when $d_{90}$ is not excessively large, an advantageous effect that the thickness of the solid electrolyte membrane can be easily made thin can also be obtained.

The number-based particle size distribution (data based on which $d_{10}$, $d_{50}$, and $d_{90}$ are calculated) can be obtained, for example, through the following procedures including: (1) imaging the particles with an electron microscope; (2)

measuring a one-direction tangential diameter (Feret diameter) of each of the particles in the obtained image; and (3) plotting the one-direction tangential diameter (Feret diameter) of each of the particles on the horizontal axis and plotting the number-based frequency on the vertical axis. A specific example of the method of obtaining the frequency distribution will be described with reference to the description of Examples.

(Other Matters)

Typically, the inorganic solid electrolyte material according to the present embodiment has excellent electrochemical stability. The electrochemical stability refers to, for example, a property in which a material is not likely to be oxidized and reduced in a wide voltage range. More specifically, in the inorganic solid electrolyte material according to the present embodiment, a maximum value of an oxidative decomposition current measured under conditions of temperature of 25° C., a sweep voltage range of 0 to 5 V, and a voltage sweep rate of 5 mV/sec is preferably 0.50 μA or lower, more preferably 0.20 μA or lower, still more preferably 0.10 μA or lower, still more preferably 0.05 μA or lower, and still more preferably 0.03 μA or lower.

When the maximum value of the oxidative decomposition current in the inorganic solid electrolyte material is the above-described upper limit value or lower, the oxidative decomposition of the inorganic solid electrolyte material in the lithium ion battery can be suppressed, which is preferable.

The lower limit value of the maximum value of the oxidative decomposition current in the inorganic solid electrolyte material is not particularly limited and is, for example, 0.0001 μA or higher.

The inorganic solid electrolyte material according to the present embodiment can be used for any application where lithium ionic conductivity is required. In particular, it is preferable that the inorganic solid electrolyte material according to the present embodiment is used for a lithium ion battery. More specifically, the inorganic solid electrolyte material according to the present embodiment is used for a positive electrode active material layer, a negative electrode active material layer, an electrolyte layer, or the like in a lithium ion battery. Further, the inorganic solid electrolyte material according to the present embodiment is suitably used for a positive electrode active material layer, a negative electrode active material layer, a solid electrolyte layer, or the like forming an all-solid-state lithium ion battery, and is more suitably used for a solid electrolyte layer forming an all-solid-state lithium ion battery.

Examples of the all-solid-state lithium ion battery to which the inorganic solid electrolyte material according to the present embodiment is applied include an all-solid-state lithium ion battery in which a positive electrode, a solid electrolyte layer, and a negative electrode are stacked in this order.

(Method of Manufacturing Inorganic Solid Electrolyte Material)

The inorganic solid electrolyte material according to the present embodiment can be obtained, for example, preferably using a manufacturing method including steps (A), (B1), (B2), and (C) described below.

In addition, it is preferable that the method of manufacturing the inorganic solid electrolyte material according to the present embodiment optionally further includes a step (D) described below. In this case, the step (C) may be performed before or after the step (D) or may be performed before and after the step (D).

Step (A): a step of preparing a raw material composition of an inorganic solid electrolyte material including lithium sulfide and phosphorus sulfide Step (B1): a step of obtaining an inorganic solid electrolyte material in a vitreous state by mechanically processing the raw material composition of the inorganic solid electrolyte material such that the lithium sulfide and the phosphorus sulfide as raw materials are vitrified in a chemical reaction Step (B2): a step of crushing the obtained inorganic solid electrolyte material in the vitreous state to refine the inorganic solid electrolyte material Step (C): a step of classifying the obtained inorganic solid electrolyte material Step (D): a step of heating (annealing) the obtained inorganic solid electrolyte material in the vitreous state such that at least a part thereof is crystallized In the present embodiment, by appropriately performing the step (B2) and/or (C), the inorganic solid electrolyte material where $D_{10}$ is 0.54 to 0.80 and $d_{50}$ is 0.1 to 10 μm can be easily manufactured. In particular, in the present embodiment, it is preferable to perform both of the steps (B2) and (C).

Hereinafter, each of the steps will be described in detail.

Step (A) of Preparing Raw Material Composition

First, a raw material composition of an inorganic solid electrolyte material including lithium sulfide and phosphorus sulfide as raw materials at a specific ratio is prepared. Here, a mixing ratio between the respective raw materials in the raw material composition is adjusted such that the obtained inorganic solid electrolyte material has a desired composition ratio.

The raw material composition of the inorganic solid electrolyte material may further include lithium nitride.

A method of mixing the respective raw materials is not particularly limited as long as it is a mixing method capable of uniformly mixing the respective raw materials. For example, the raw materials can be mixed using a ball mill, a beads mill, a vibrating mill, an impact crushing device, a mixer (for example, a pug mixer, a ribbon mixer, a tumbler mixer, a drum mixer, or a V-type mixer), a kneader, a twin-screw kneader, an air flow grinder, or the like. On a laboratory scale, mixing using a mortar of agate, alumina, or the like may be used.

Mixing conditions such as a stirring rate, a processing time, a temperature, a reaction pressure, or a gravitational acceleration applied to the mixture during the mixing of the respective raw materials can be appropriately determined depending on the amount of the mixture processed.

The lithium sulfide used as a raw material is not particularly limited. A commercially available lithium sulfide may be used. For example, lithium sulfide obtained by reaction of lithium hydroxide and hydrogen sulfide may also be used. From the viewpoint of obtaining the high-purity inorganic solid electrolyte material and suppressing a side reaction, it is preferable that lithium sulfide having little impurities is used.

In the present embodiment, examples of the lithium sulfide include lithium polysulfide. As the lithium sulfide, $Li_2S$ is preferable.

The phosphorus sulfide used as a raw material is not particularly limited. For example, commercially available phosphorus sulfide (for example, $P_2S_5$, $P_4S_3$, $P_4S_7$, or $P_4S_5$) can be used. From the viewpoint of obtaining the high-purity inorganic solid electrolyte material and suppressing a side reaction, it is preferable that phosphorus sulfide having little impurities is used. As the phosphorus sulfide, $P_2S_5$ is preferable. In addition, instead of phosphorus sulfide, elemental phosphorus (P) and elemental sulfur (S) at the corresponding molar ratio can also be used. As the elemental phosphorus (P) and the elemental sulfur (S), any phosphorus and any sulfur can be used without any particular limitation as long as they are industrially produced and are commercially available.

Lithium nitride may be used as a raw material. Here, Nitrogen in the lithium nitride is discharged into the system as $N_2$. Therefore, by using lithium nitride as an inorganic compound that is a raw material, only the Li composition can be increased with respect to the inorganic solid electrolyte material including Li, P, and S as constituent elements.

The lithium nitride used as a raw material is not particularly limited. A commercially available lithium nitride (for example, $Li_3N$) may be used. For example, lithium nitride obtained by reaction of metallic lithium (for example, Li foil) and nitrogen gas may also be used. From the viewpoint of obtaining the high-purity solid electrolyte material and suppressing a side reaction, it is preferable that lithium nitride having little impurities is used.

Step (B1) of Obtaining Inorganic Solid Electrolyte Material In Vitreous State

Next, the inorganic solid electrolyte material in the vitreous state is obtained by mechanically processing the raw material composition of the inorganic solid electrolyte material such that the lithium sulfide, the phosphorus sulfide, and optionally the lithium nitride as raw materials are vitrified in a chemical reaction.

Here, the mechanical process refers to a process of causing two or more kinds of inorganic compounds to mechanically collide with each other to be vitrified in a chemical reaction. Examples of the mechanical process include a mechanochemical process. The mechanochemical process refers to a method of vitrifying a target composition while applying a mechanical energy such as a shear force or an impact force.

In the step (B1), it is preferable that the mechanochemical process is a dry mechanochemical process from the viewpoint of realizing the process in an environment where water or oxygen is removed at a high level.

By applying the mechanochemical process, the respective raw materials can be mixed while crushing the raw materials into fine particles. Therefore, the contact area of the respective raw materials can be increased. As a result, the reaction of each of the raw materials can be promoted. Therefore, the inorganic solid electrolyte material according to the present embodiment can be more efficiently obtained.

The mechanochemical process refers to a method of vitrifying a mixing target while applying a mechanical energy such as a shear force, an impact force, or a centrifugal force. Examples of a device (vitrification device) for performing the vitrification through the mechanochemical process include: a crusher and disperser such as a ball mill, a beads mill, a vibrating mill, a turbo mill, a mechano-fusion, a disc mill, or a roll mill; a rotation and impact crushing device including a mechanism as a combination of rotation (shearing stress) and impact (compressive stress) represented by a rock drill, a vibration drill, or an impact driver; and a high-pressure grinding roll. In particular, from the viewpoint of efficiently generating a very high impact energy, a ball mill or a beads mill is preferable, and a ball mill is more preferable. In addition, from the viewpoint of obtaining excellent continuous productivity, for example, a roll mill; a rotation and impact crushing device including a mechanism as a combination of rotation (shearing stress) and impact (compressive stress) represented by a rock drill, a vibration drill, or an impact driver; a high-pressure grinding roll; or a vertical mill such as a roller vertical mill or a ball vertical mill is preferable.

It is preferable that the step (B1) is performed using a ball mill. When the step (B1) is performed using a ball mill, it is preferable that balls to be used are formed of zirconia.

When the step (B1) is performed using a ball mill, from the viewpoints of efficiency of the chemical reaction (mechanochemical reaction), adjustment of the particle size, and the like, the diameter of the balls to be used is, for example, 10 to 50 mm and preferably 10 to 30 mm, and the material of the balls to be used is preferably zirconia.

When the step (B1) is performed using a ball mill, from the viewpoint of causing the chemical reaction (mechanochemical reaction) to sufficiently progress, the time of the step (B1) is typically 10 hours or longer and preferably 200 hours or longer, and from the viewpoints of efficiency and productivity, the time of the step (B1) is typically 1500 hours or shorter and preferably 800 hours or shorter.

The degree of vitrification will be supplemented. Typically, when X-ray diffraction analysis is performed using CuKα rays as a radiation source, if a diffraction peak derived from the raw material is lost or decreases, it can be determined that the raw material inorganic composition is vitrified and a desired inorganic solid electrolyte material is obtained.

In the step (B1), it is preferable that the vitrification process is performed until the lithium ionic conductivity of the inorganic solid electrolyte material measured using an alternating current impedance method under measurement conditions of 27.0° C., an applied voltage of 10 mV, and a measurement frequency range of 0.1 Hz to 7 MHz is preferably $1.0 \times 10^{-4}$ S·cm$^{-1}$ or higher, more preferably $2.0 \times 10^{-4}$ S·cm$^{-1}$ or higher, still more preferably $3.0 \times 10^{-4}$ S·cm$^{-1}$ or higher, and still more preferably $4.0 \times 10^{-4}$ S·cm$^{-1}$ or higher. As a result, an inorganic solid electrolyte material having further improved lithium ionic conductivity can be obtained.

Step (B2) of Crushing Obtained Inorganic Solid Electrolyte Material In Vitreous State to Refine Inorganic Solid Electrolyte Material It is preferable to perform a step of appropriately crushing the inorganic solid electrolyte material that is sufficiently vitrified in the step (B1) to refine the inorganic solid electrolyte material. As a result, $D_{10}$ is likely to be adjusted to 0.54 to 0.80.

The step (B2) itself can be performed using the same device as the step (B1). It is preferable that the step (B2) is performed using a ball mill. When the process is performed using a ball mill, by appropriately selecting conditions such as the material or the diameter of the balls or the processing time, in particular, $D_{10}$ is likely to be adjusted to 0.54 to 0.80. When the step (B2) is performed using a ball mill, it is preferable that the diameter of the balls to be used is sufficiently less than that of the balls to be used when the step (B1) is performed using a ball mill. Specifically, at least a part of the balls to be used when the step (B2) is performed using a ball mill has preferably a diameter of 0.5 mm or more and 5 mm or less and more preferably a diameter of 1 mm or more and 2 mm or less. In addition, when the step (B2) is performed using a ball mill, it is preferable that balls to be used are formed of zirconia. It is presumed that, by using the balls having an appropriate size and formed of an appropriate material (hardness), the inorganic solid electrolyte material in the vitreous state is hit with "appropriate force" and appropriately refined, and the particles are "rounded" to obtain particles having an appropriate circularity.

Although depending on the time of the ball mill treatment, when the ball mill treatment is performed using balls having an excessively small diameter (for example, balls having a diameter of 0.1 mm or less), there is a case where $D_{10}$ is not likely to be adjusted to 0.54 to 0.80. The details are unclear, and when balls having an excessively small diameter are used, the particles are hit with a weak force, the particles are excessively rounded, and there is a possibility that $D_{10}$ is not likely to be adjusted to 0.54 to 0.80.

The time of the ball mill treatment in the step (B2) is not particularly limited. The time is typically 0.1 to 500 hours. Incidentally, not that, when the time of the ball mill treatment is excessively long, the particles are excessively refined, a large number of deformed particles are likely to be formed, and there is a case where $D_{10}$ is not likely to be adjusted to 0.54 to 0.80.

When the ball mill treatment is performed in the step (B2), the ball mill treatment may be sequentially performed using balls having different diameters. As a result, for example, particles having a relatively small value of $d_{50}$ can be efficiently obtained.

Note that, from the viewpoint of adjusting $D_{10}$ to 0.54 to 0.80, at least a part of the balls to be used in the ball mill treatment has preferably a diameter of 0.5 to 10 mm and more preferably a diameter of 1 to 5 mm. In addition, the time of the ball mill treatment is preferably 1 to 100 hours and more preferably 10 to 70 hours. When the diameter of the balls to be used in the ball mill treatment is not excessively small and/or when the time of the ball mill treatment is not excessively long, the inorganic solid electrolyte material according to the present embodiment is likely to be manufactured.

When the ball mill treatment is performed, in order to make the process efficient, the ball mill treatment may be temporarily stopped to scrape off powder from an inner wall of the device or balls and may be put the powder again into the device together with the balls.

The amount of the balls used in the ball mill treatment is not particularly limited as long as the process can be sufficiently performed. Typically, 500 to 10000 parts by mass of the balls with respect to 100 parts by mass of the raw material composition can be used.

In the present embodiment, it is preferable that the steps (B1) and (B2) are performed in an atmosphere where the abundance and inflow of water and oxygen are suppressed at a higher level than that in the related art. As a result, contact between the raw material composition and water and oxygen can be suppressed at a higher level than in the related art.

The atmosphere where the abundance and inflow of water and oxygen are suppressed at a higher level than that in the related art can be formed, for example, using the following method.

First, a mixing container and a sealed container for a vitrification device are disposed in a glove box. Next, in the glove box, introduction and vacuum evacuation of inert gas such as dry argon gas or dry nitrogen gas having a high purity obtained through a gas purification device are performed multiple times (preferably three or more times). Here, in the glove box after the operation, the inert gas such as dry argon gas or dry nitrogen gas having a high purity is circulated through the gas purification device such that the oxygen concentration and the water concentration are adjusted to be preferably 1.0 ppm or less, more preferably 0.8 ppm or less, and still more preferably 0.6 ppm or less.

Next, lithium sulfide and phosphorus sulfide are put into the mixing container of the glove box and are subsequently mixed to prepare a raw material composition (refer to the step (A)). Here, the introduction of lithium sulfide and phosphorus sulfide into the mixing container of the glove box is performed through the following procedures. First, in a state where a door in a main body of the glove box is closed, lithium sulfide and phosphorus sulfide are put into a side box of the glove box. Next, in the side box, introduction and vacuum evacuation of inert gas such as dry argon gas or dry nitrogen gas having a high purity introduced from the glove box are performed multiple times (preferably three or more times). Next, the door in the main body of the glove box is opened, lithium sulfide and phosphorus sulfide are put into the mixing container in the main body of the glove box, and the mixing container is sealed.

Next, after mixing lithium sulfide and phosphorus sulfide, the obtained raw material composition is taken out from the mixing container and is transferred to the container for a vitrification device, and the container is sealed.

By performing this operation, the abundance of water and oxygen in the sealed container containing the raw material composition can be suppressed at a higher level than in the related art, and thus the atmosphere where the abundance of water and oxygen is suppressed at a higher level than in the related art can be formed in the steps (B1) and (B2).

Next, the sealed container containing the raw material inorganic composition is taken out from the glove box. Next, the sealed container is set in the vitrification device disposed in the atmosphere filled with dry gas such as dry argon gas, dry nitrogen gas, or dry air (for example, in a box filled with dry argon gas, dry nitrogen gas, or dry air) for vitrification. Here, during the vitrification, it is preferable to continuously introduce a given amount of dry gas into the atmosphere filled with dry gas. With this configuration, the atmosphere where the inflow of water and oxygen is suppressed at a higher level than in the related art can be formed in the steps (B1) and (B2).

From the viewpoint of suppressing the inflow of water and oxygen in the sealed container at a high level and from the viewpoint of realizing higher airtightness, it is preferable that a packing having excellent sealing performance such as an O-ring or a ferrule packing is used for a lid portion of the sealed container.

Classification (Sieving) Step (C)

Next, it is preferable to classify (sieve) the obtained inorganic solid electrolyte material. By performing this process, particles where $d_{50}$ is 10 μm or less and $D_{10}$ is 0.54 to 0.80 are likely to be obtained. The details are not clear but are presumed to be that, by performing the classification (sieving), a part or all of particles having a relatively large particle size are removed and a part or all of particles having an extremely small circularity are also removed.

From the viewpoint of optimizing $D_{10}$ or $d_{50}$, it is preferable to perform the classification (sieving) using a sieve having a pore size of about 20 μm.

The inorganic solid electrolyte material may be further crushed to adjust the particle size or the like. As a specific method of the crushing process, a well-known crushing method such as air flow crushing, a mortar, a tumbling mill, or a coffee mill can be used.

From the viewpoint of avoiding contact with water in air, it is preferable that the step (C) is performed in an inert gas atmosphere or a vacuum atmosphere.

Step (D) of Crystallizing at Least Part of Inorganic Solid Electrolyte Material

In the present embodiment, a step of crystallizing at least a part of the inorganic solid electrolyte material may be performed. In the step (D), the inorganic solid electrolyte material in the glass ceramic state (also referred to as "crystallized glass") is formed by heating (annealing) the obtained inorganic solid electrolyte material in the vitreous state such that at least a part of the inorganic solid electrolyte material is crystallized. As a result, an inorganic solid electrolyte material having further improved lithium ionic conductivity can be obtained.

That is, from the viewpoint of obtaining excellent lithium ionic conductivity, it is preferable that the inorganic solid electrolyte material according to the present embodiment is in the glass ceramic state (crystallized glass state).

The temperature at which the inorganic solid electrolyte material in the vitreous state is heated (annealed) is preferably in a range of 220° C. or higher and 500° C. or lower and more preferably in a range of 250° C. or higher and 350° C. or lower.

The time for which the inorganic solid electrolyte material in the vitreous state is heated (annealed) is not particularly limited as long as it is the time for which the desired inorganic solid electrolyte material in the glass ceramic state can be obtained. For example, the time is 0.5 hours or longer and 24 hours or shorter and preferably 1 hour or longer and 3 hours or shorter. A heating method is not particularly limited, and examples thereof include a method using a calcination furnace. Conditions such as the temperature or the time of heating can be appropriately adjusted for optimizing the properties of the inorganic solid electrolyte material.

In addition, it is preferable that the inorganic solid electrolyte material in the vitreous state is heated (annealed), for example, in an inert gas atmosphere. As a result, deterioration (for example, oxidation) of the inorganic solid electrolyte material can be prevented. Examples of the inert gas include argon gas, helium gas, and nitrogen gas. In order to prevent impurities from being mixed in a product, it is preferable that the purity of the inert gas is as high as possible. In addition, in order to avoid contact with water, the dew point is preferably −70° C. or lower and more preferably −80° C. or lower.

A method of introducing the inert gas is not particularly limited as long as it is a method capable of filling the mixed system with the inert gas atmosphere. Examples of the introduction method include a method of purging inert gas and a method continuously introducing inert gas at a given flow rate.

In order to obtain the inorganic solid electrolyte material according to the present embodiment, it is preferable to appropriately adjust various conditions in the respective steps. The method of manufacturing the inorganic solid electrolyte material according to the present embodiment is not limited to the above-described method. By appropriately adjusting various conditions, the inorganic solid electrolyte material according to the present embodiment can be obtained.

<Solid Electrolyte>

A solid electrolyte according to the present embodiment includes the inorganic solid electrolyte material according to the present embodiment.

As components other than the inorganic solid electrolyte material according to the present embodiment, the solid electrolyte according to the present embodiment may include or may not include various kinds of solid electrolyte materials other than the inorganic solid electrolyte material according to the present embodiment, for example, within a range where the object of the present invention does not deteriorate.

The solid electrolyte according to the present embodiment may include or may not include various kinds of solid electrolyte materials other than the inorganic solid electrolyte material according to the present embodiment. The solid electrolyte material other than the inorganic solid electrolyte material according to the present embodiment is not particularly limited as long as they have ionic conductivity and insulating properties. In general, a solid electrolyte material that is used for a lithium ion battery can be used. Examples of the solid electrolyte materials include: an inorganic solid electrolyte material such as a inorganic solid electrolyte material other than the inorganic solid electrolyte material according to the present embodiment, an oxide-based inorganic solid electrolyte material, or other lithium-based inorganic solid electrolyte materials; and an organic solid electrolyte material such as a polymer electrolyte.

Examples of the inorganic solid electrolyte material other than the inorganic solid electrolyte material according to the present embodiment include a $Li_2S$—$P_2S_5$ material, a $Li_2S$—$SiS_2$ material, a $Li_2S$—$GeS_2$ material, a $Li_2S$—$Al_2S_3$ material, a $Li_2S$—$SiS_2$—$Li_3PO_4$ material, a $Li_2S$—$P_2S_5$—$GeS_2$ material, a $Li_1S$—$Li_2O$—$P_2S_5$—$SiS_2$ material, a $Li_2S$—$GeS_2$—$P_2S_5$—$SiS_2$ material, a $Li_2S$—$SnS_2$—$P_2S_5$—$SiS_2$ material, a $Li_2S$—$P_2S_5$—$Li_3N$ material, a $Li$—$S_{2+x}$—$P_4S_3$ material, and a $Li_2S$—$P_2S_5$—$P_4S_3$ material. Among these, one kind may be used singly, or two or more kinds may be used in combination.

Among these, the $Li_2S$—$P_2S_5$ material is preferable from the viewpoint that it has excellent lithium ionic conductivity and has stability to the extent that decomposition or the like does not occur in a wide voltage range. Here, for example, the $Li_2S$—$P_2S_5$ material refers to an inorganic material obtained by a chemical reaction caused by mechanically processing an inorganic composition including at least $Li_2S$ (lithium sulfide) and $P_2S_5$.

Here, in the present embodiment, examples of the lithium sulfide include lithium polysulfide.

Examples of the oxide-based inorganic solid electrolyte material include: a NASICON type such as $LiTi_2(PO_4)_3$, $LiZr_2(PO_4)_3$, or $LiGe_2(PO_4)_3$; a perovskite type such as $(La_{0.5+x}Li_{0.5-3x})TiO_3$; a $Li_2O$—$P_2O_5$ material; and a $Li_2O$—$P_2O_5$—$Li_3N$ material.

Examples of the other lithium-based inorganic solid electrolyte material include $LiPON$, $LiNbO_3$, $LiTaO_3$, $Li_3PO_4$, $LiPO_{4-x}N_x$ (x satisfies $0<x\leq1$), $LiN$, $LiI$, and $LISICON$.

Further, a glass ceramic obtained by precipitating crystal of the inorganic solid electrolytes can also be used as the inorganic solid electrolyte material.

As the organic solid electrolyte material, a polymer electrolyte such as a dry polymer electrolyte or a gel electrolyte can be used.

As the polymer electrolyte, in general, those that are used for a lithium ion battery can be used.

<Solid Electrolyte Membrane>

The solid electrolyte membrane according to the present embodiment includes a solid electrolyte including the inorganic solid electrolyte material according to the present embodiment as a main component.

The solid electrolyte membrane according to the present embodiment is used, for example, as a solid electrolyte layer forming an all-solid-state lithium ion battery.

Examples of the all-solid-state lithium ion battery to which the solid electrolyte membrane according to the present embodiment is applied include an all-solid-state lithium ion battery in which a positive electrode, a solid electrolyte layer, and a negative electrode are stacked in this order. In this case, the solid electrolyte layer is formed of the solid electrolyte membrane.

The average thickness of the solid electrolyte membrane according to the present embodiment is preferably 5 μm or more and 500 μm or less, more preferably 10 μm or more and 200 μm or less, and still more preferably 20 μm or more and 100 μm or less. When the average thickness of the solid electrolyte membrane is the lower limit value or more, the loss of the solid electrolyte or the cracking of the solid electrolyte membrane surface can be further suppressed. In addition, when the average thickness of the solid electrolyte membrane is the upper limit value or less, the impedance of the solid electrolyte membrane can be further decreased. As a result, the battery characteristics of the obtained all-solid-state lithium ion battery can be further improved.

It is preferable that the solid electrolyte membrane according to the present embodiment is a compact obtained by compression-molding the particle-shaped solid electrolyte including the inorganic solid electrolyte material according to the present embodiment. That is, it is preferable that the particle-shaped solid electrolyte is compression-molded to obtain a solid electrolyte membrane having a given strength due to the anchor effect between the solid electrolyte material particles.

By obtaining the compact, the solid electrolyte particles bind to each other, and the strength of the obtained solid electrolyte membrane can be further improved. As a result, the loss of the solid electrolyte or the cracking of the solid electrolyte membrane surface can be further suppressed.

The content of the inorganic solid electrolyte material according to the present embodiment in the solid electrolyte membrane according to the present embodiment is preferably 50 mass % or more, more preferably 60 mass % or more, still more preferably 70 mass % or more, still more preferably 80 mass % or more, and still more preferably 90 mass % or more with respect to 100 mass % of the total mass of the solid electrolyte membrane. As a result, the contact between the solid electrolyte particles can be improved, and the interfacial contact resistance of the solid electrolyte membrane can be decreased. As a result, the lithium ionic conductivity of the solid electrolyte membrane can be further improved. By using the solid electrolyte membrane having excellent lithium ionic conductivity, the battery characteristics of the obtained all-solid-state lithium ion battery can be further improved.

The upper limit of the content of the inorganic solid electrolyte material according to the present embodiment in the solid electrolyte membrane according to the present embodiment is not particularly limited and is, for example, 100 mass; or less.

The planar shape of the solid electrolyte membrane is not particularly limited and can be appropriately selected according to the shape of an electrode or a current collector. For example, the planar shape is rectangular.

The solid electrolyte membrane according to the present embodiment may include a binder resin. When the solid electrolyte membrane according to the present embodiment includes the binder resin, the content of the binder resin is preferably less than 0.5 mass %, more preferably 0.1 mass % or less, still more preferably 0.05 mass % or less, and still more preferably 0.01 mass % or less with respect to 100 mass; of the total mass of the solid electrolyte membrane. In addition, it is more preferable that the solid electrolyte membrane according to the present embodiment does not substantially include the binder resin, and it is more preferable that the solid electrolyte membrane according to the present embodiment does not include the binder resin.

As a result, the contact between the solid electrolyte particles can be improved, and the interfacial contact resistance of the solid electrolyte membrane can be decreased. As a result, the lithium ionic conductivity of the solid electrolyte membrane can be further improved. By using the solid electrolyte membrane having excellent lithium ionic conductivity, the battery characteristics of the obtained all-solid-state lithium ion battery can be improved.

Just to be sure, "Substantially not including the binder resin" represents that the binder resin may be included to the extent that the effect of the present embodiment does not deteriorate. In addition, when an adhesive resin layer is provided between the solid electrolyte layer and the positive electrode or the negative electrode, an adhesive resin derived from the adhesive resin layer present in the vicinity of an interface between the solid electrolyte layer and the adhesive resin layer is excluded from "the binder resin in the solid electrolyte membrane".

In order to bind the inorganic solid electrolyte material particles to each other, the binder resin refers to a binder that is generally used for a lithium ion battery. Examples of the binder resin include polyvinyl alcohol, poly(meth)acrylic acid, carboxymethyl cellulose, polytetrafluoroethylene, polyvinylidene fluoride, styrene-butadiene rubber, and polyimide.

The solid electrolyte membrane according to the present embodiment can be obtained, for example, by (i) depositing the particle-shaped solid electrolyte on a cavity surface of a mold or a substrate surface in a film shape and (ii) subsequently compress-molding the solid electrolyte deposited in a film shape.

In (ii), a method of compress-molding the solid electrolyte is not particularly limited. For example, when the particle-shaped solid electrolyte is deposited on a cavity surface of a mold, a method such as pressing by a mold and a stamp can be used, and when the particle-shaped solid electrolyte is deposited on a substrate surface, a method such as pressing, roll pressing, or flat pressing by a mold and a stamp can be used. The pressure at which the solid electrolyte is compressed is, for example, 10 MPa or higher or 500 MPa or lower.

Optionally, the inorganic solid electrolyte deposited in a film shape may be compressed and heated. The solid electrolyte particles are fused and bound to each other by performing the heating and compressing, and the strength of the obtained solid electrolyte membrane can be further improved. As a result, the loss of the solid electrolyte or the cracking of the solid electrolyte membrane surface can be further suppressed. The temperature at which the solid electrolyte is heated is, for example, 40° C. or higher and 500° C. or lower.

<Lithium Ion Battery>

FIG. 2 is a cross-sectional view showing an example (lithium ion battery 10) of a structure of a lithium ion battery according to the present embodiment.

The lithium ion battery 100 includes: a positive electrode 110 including a positive electrode active material layer 101; an electrolyte layer 120; and a negative electrode 130 including a negative electrode active material layer 103. At least one of the positive electrode active material layer 101, the negative electrode active material layer 103, and the electrolyte layer 120 includes the inorganic solid electrolyte material according to the present embodiment. In addition, it is preferable that all of the positive electrode active material layer 101, the negative electrode active material layer 103, and the electrolyte layer 120 include the inorganic solid electrolyte material according to the present embodiment.

In the present embodiment, unless specified otherwise, a layer including a positive electrode active material will be referred to as "the positive electrode active material layer 101".

Optionally, the positive electrode 110 may or may not further include a current collector 105 in addition to the positive electrode active material layer 101. In addition, in the present embodiment, unless specified otherwise, a layer including a negative electrode active material will be referred to as "the negative electrode active material layer 103". Optionally, the negative electrode 130 may or may not further include the current collector 105 in addition to the negative electrode active material layer 103.

The shape of the lithium ion battery 100 according to the present embodiment is not particularly limited. Examples of the shape include a cylindrical shape, a coin shape, a square shape, a film shape, and any other shape.

The lithium ion battery 100 is manufactured using a generally well-known method. For example, the lithium ion battery 100 is prepared by forming a laminate including the positive electrode 110, the electrolyte layer 120, and the negative electrode 130 in a cylindrical shape, a coin shape, a square shape, a film shape, or any other shape and optionally filling the laminate with a non-aqueous electrolytic solution.

(Positive Electrode)

The material forming the positive electrode 110 is not particularly limited, and a positive electrode that is generally used for a lithium ion battery can be used. A method of manufacturing the positive electrode 110 is not particularly limited, and the positive electrode 110 can be manufactured using a generally well-known method. For example, the positive electrode 110 can be obtained by forming the positive electrode active material layer 101 including the positive electrode active material on a surface of the current collector 105 such as aluminum foil.

The thickness or density of the positive electrode active material layer 101 is appropriately determined depending on the intended use of the battery and, thus can be set based on generally well-known information without any particular limitation.

The positive electrode active material layer 101 includes the positive electrode active material.

The positive electrode active material is not particularly limited, and a generally well-known material can be used. For example, a composite oxide such as a lithium cobalt oxide ($LiCoO_2$), a lithium nickel oxide ($LiNiO_2$), a lithium manganese oxide ($LiMn_2O_4$), a solid solution oxide ($Li_2MnO_3$-$LiMO_2$ (M=Co, Ni, or the like)), lithium-manganese-nickel oxide ($LiNi_{1/3}Mn_{1/3}Co_{1/3}O_2$), or an olivine-type lithium phosphate ($LiFePO_4$); a conductive polymer such as polyaniline or polypyrrole; a sulfide-based positive electrode active material such as $Li_2S$, CuS, a Li—Cu—S compound, $TiS_2$, FeS, $MoS_2$, a Li—Mo—S compound, a Li—Ti—S compound, a Li—V—S compound, or a Li—Fe—S compound; or a material including sulfur as an active material such as acetylene black impregnated with sulfur, porous carbon impregnated with sulfur, or mixed powder including sulfur and carbon can be used. Among these positive electrode active materials, one kind may be used singly, or two or more kinds may be used in combination.

Among these, from the viewpoints of obtaining higher discharge capacity density and obtaining higher cycle characteristics, a sulfide-based positive electrode active material is preferable, and one kind or two or more kinds selected from a Li—Mo—S compound, a Li—Ti—S compound, and a Li—V—S compound are more preferable.

Here, the Li—Mo—S compound includes Li, Mo, and S as constituent elements and can be typically obtained by a chemical reaction caused by mechanically processing an inorganic composition including molybdenum sulfide and lithium sulfide as raw materials.

In addition, the Li—Ti—S compound includes Li, Ti, and S as constituent elements and can be typically obtained by a chemical reaction caused by mechanically processing an inorganic composition including titanium sulfide and lithium sulfide as raw materials.

The Li—V—S compound includes Li, V, and S as constituent elements and can be typically obtained by a chemical reaction caused by mechanically processing an inorganic composition including vanadium sulfide and lithium sulfide as raw materials.

The positive electrode active material layer 101 may include or may not include, as components other than the positive electrode active material, for example, one or more materials selected from a binder resin, a thickener, a conductive auxiliary agent, a solid electrolyte material, and the like. Hereinafter, each of the materials such as the binder resin, the thickener, the conductive auxiliary agent, and the solid electrolyte material will be described.

The positive electrode active material layer 101 may include a binder resin having a function of binding the positive electrode active material particles to each other and binding the positive electrode active material and the current collector 105 to each other.

The binder resin is not particularly limited as long as it is a typical binder resin that can be used for a lithium ion battery. Examples of the binder resin include polyvinyl alcohol, poly(meth)acrylic acid, carboxymethyl cellulose, polytetrafluoroethylene, polyvinylidene fluoride, styrene-butadiene rubber, and polyimide. Among the binders, one kind may be used singly, or two or more kinds may be used in combination.

From the viewpoint of securing the fluidity of a slurry suitable for application, the positive electrode active material layer 101 may include a thickener. The thickener is not particularly limited as long as it is a typical thickener that can be used for a lithium ion battery. Examples of the thickener include a cellulose-based polymer such as carboxymethyl cellulose, methyl cellulose, or hydroxypropyl cellulose and an ammonium salt and an alkali metal salt thereof; and a water-soluble polymer such as polycarboxylic acid, polyethylene oxide, polyvinyl pyrrolidone, poly(meth)acrylate, or polyvinyl alcohol. Among the thickeners, one kind may be used singly, or two or more kinds may be used in combination.

From the viewpoint of improving the conductivity of the positive electrode 110 the positive electrode active material layer 101 may include a conductive auxiliary agent. The conductive auxiliary agent is not particularly limited as long as it is a typical conductive auxiliary agent that can be used for a lithium ion battery. Examples of the conductive auxiliary agent include a carbon black such as Acetylene black or Ketjen black and a carbon material such as a vapor-grown carbon fiber. When the conductive auxiliary agent is used, one kind may be used singly, or two or more kinds may be used in combination.

The positive electrode 110 may include a solid electrolyte including the inorganic solid electrolyte material according to the present embodiment or may include a solid electrolyte including a solid electrolyte material other than the inorganic solid electrolyte material according to the present embodiment. The solid electrolyte material other than the inorganic solid electrolyte material according to the present embodiment is not particularly limited as long as they have ionic conductivity and insulating properties. In general, a solid electrolyte material that is used for a lithium ion battery can be used. Examples of the solid electrolyte material include: an inorganic solid electrolyte material such as an inorganic solid electrolyte material, an oxide-based inorganic solid electrolyte material, or other lithium-based inorganic solid electrolyte materials; and an organic solid electrolyte material such as a polymer electrolyte. More specifically, the inorganic solid electrolyte material described above regarding the description of the solid electrolyte according to the present embodiment can be used.

The mixing ratio between various materials in the positive electrode active material layer 101 is appropriately determined depending on the intended use of the battery and, thus can be set based on generally well-known information without any particular limitation.

(Negative Electrode)

The material forming the negative electrode 130 is not particularly limited, and a positive electrode that is generally used for a lithium ion battery can be used. A method of manufacturing the negative electrode 130 is not particularly limited, and the negative electrode 130 can be manufactured using a generally well-known method. For example, the negative electrode 130 can be obtained by forming the negative electrode active material layer 103 including the negative electrode active material on a surface of the current collector 105 such as copper.

The thickness or density of the negative electrode active material layer 103 is appropriately determined depending on the intended use of the battery and, thus can be set based on generally well-known information without any particular limitation.

The negative electrode active material layer 103 includes the negative electrode active material.

The negative electrode active material is not particularly limited as long as it is a typical negative electrode active material that can be used for a negative electrode of a lithium ion battery. Examples of the negative electrode active material include: a carbon material such as natural graphite, artificial graphite, resinous coal, carbon fiber, activated charcoal, hard carbon, or soft carbon; a metal material mainly formed of lithium, a lithium alloy, tin, a tin alloy, silicon, a silicon alloy, gallium, a gallium alloy, indium, an indium alloy, aluminum, or an aluminum alloy; a conductive polymer such as polyacene, polyacetylene, or polypyrrole; and a lithium titanium composite oxide (for example, $Li_4Ti_5O_{12}$). Among these negative electrode active materials, one kind may be used singly, or two or more kinds may be used in combination.

The negative electrode active material layer 103 is not particularly limited and may include, as components other than the negative electrode active material, for example, one or more materials selected from a binder resin, a thickener, a conductive auxiliary agent, a solid electrolyte material, and the like. These materials are not particularly limited, and examples thereof are the same as those of the materials used for the positive electrode 110.

The mixing ratio between various materials in the negative electrode active material layer 103 is appropriately determined depending on the intended use of the battery and, thus can be set based on generally well-known information without any particular limitation.

(Electrolyte Layer)

The electrolyte layer 120 is a layer formed between the positive electrode active material layer 101 and the negative electrode active material layer 103.

Examples of the electrolyte layer 120 include a separator impregnated with a non-aqueous electrolytic solution and a solid electrolyte layer including a solid electrolyte.

The separator is not particularly limited as long as it has a function of electrically insulating the positive electrode 110 and the negative electrode 130 to allow transmission of lithium ions. For example, a porous membrane can be used.

As the porous membrane, a microporous polymer film is suitably used, and examples of a material thereof include polyolefin, polyimide, polyvinylidene fluoride, and polyester. In particular, a porous polyolefin film is preferable, and specific examples thereof include a porous polyethylene film and a porous polypropylene film.

The non-aqueous electrolytic solution with which the separator is impregnated is obtained by dissolving an electrolyte in a solvent. As the electrolyte, any well-known lithium salt can be used, and the electrolyte may be selected depending on the kind of the active material. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and a lithium lower aliphatic carboxylate.

The solvent in which the electrolyte is dissolved is not particularly limited as long as it is typically used as a liquid in which the electrolyte is dissolved. Examples of the solvent include: a carbonate such as ethylene carbonate (EC), propylene carbonate (PC), butylene carbonate (BC), dimethyl carbonate (DMC), diethyl carbonate (DEC), methyl ethyl carbonate (MEC), or vinylene carbonate (VC); a lactone such as γ-butyrolactone or γ-valerolactone; an ether such as trimethoxy methane, 1,2-dimethoxyethane, diethyl ether, 2-ethoxy ethane, tetrahydrofuran, or 2-methyl tetrahydrofuran; a sulfoxide such as dimethyl sulfoxide; an oxolane such as 1,3-dioxolane or 4-methyl-1,3-dioxolane; a nitrogen-containing solvent such as acetonitrile, nitromethane, formamide, or dimethylformamide; an organic acid ester such as methyl formate, methyl acetate, ethyl acetate, butyl acetate, methyl propionate, or ethyl propionate; a phosphate triester or a diglyme; a triglyme; a sulfolane such as sulfolane or methyl sulfolane; an oxazolidinone such as 3-methyl-2-oxazolidinone; and a sultone such as 1,3-propanesultone, 1,4-butanesultone, or naphthasultone. Among these, one kind may be used singly, or two or more kinds may be used in combination.

The solid electrolyte layer is a layer formed between the positive electrode active material layer 101 and the negative electrode active material layer 103, and is formed of a solid electrolyte including a solid electrolyte material. The solid electrolyte in the solid electrolyte layer is not particularly limited as long as it has lithium ionic conductivity. Note that, in the present embodiment, it is preferable that the solid electrolyte includes the inorganic solid electrolyte material according to the present embodiment.

The content of the solid electrolyte in the solid electrolyte layer according to the present embodiment is not particularly limited as long as it has a proportion where desired performance can be obtained. For example, the content of the solid electrolyte is 10 vol % or more and 100 vol % or less and preferably 50 vol % or more and 100 vol % or less. In particular, in the present embodiment, it is preferable that the solid electrolyte layer is formed of only the solid electrolyte including the inorganic solid electrolyte material according to the present embodiment.

The solid electrolyte layer according to the present embodiment may include a binder resin. By including the binder resin, a flexible solid electrolyte layer can be obtained. Examples of the binder resin include a fluorine-containing binder such as polytetrafluoroethylene or polyvinylidene fluoride. The thickness of the solid electrolyte layer is, for example, 0.1 μm or more and 1000 μm or less and preferably 0.1 μm or more and 300 μm or less.

Hereinafter, the embodiment of the present invention has been described. However, the embodiment is merely an example of the present invention, and various configurations other than the above-described configurations can be adopted. In addition, the present invention is not limited to the above-described embodiments, and modifications, improvements, and the like within a range where the object of the present invention can be achieved are included in the present invention.

EXAMPLES

The embodiments of the present invention will be described in more detail based on Examples and Comparative Examples. Just to be sure, the present invention is not limited to only Examples.

Example 1

The inorganic solid electrolyte material was prepared through the following procedures.

(1) Preparation of Raw Materials $Li_2S$ (manufactured by Furukawa Co., Ltd., purity: 99.9%), $P_2S_5$ (manufactured by Kanto Chemical Co., Inc.), and $Li_3N$ (manufactured by Furukawa Co., Ltd.) were prepared.

(W) Weighing and Mixing Using Mortar

Next, in an argon glove box, $Li_2S$ powder, $P_2S_5$ powder, and $Li_3N$ powder were precisely weighed ($Li_1S:P_2S_5:Li_3N=27:9:2$ (molar ratio)), and these powders were mixed in an agate mortar for 10 minutes. As a result, mixed powder was obtained.

(3) Vitrification: Mechanochemical Process using Ball Mill (Crushing and Mixing)

Next, 500 g of the mixed powder obtained in (2) was weighed and was put into an alumina pot (inner volume: 5.0 L) together with 7500 g of zirconia balls having a diameter of φ 25 mm and 700 g of zirconia balls having a diameter of φ 10 mm. The mixed powder was mechanochemically processed (crushed and mixed) using a ball mill (rotation speed: 100 rpm) for 48 hours.

Next, after crushing and mixing, the powder attached to an inner wall of the pot or the balls was scraped. Next, the powder was put again into the pot together with balls, and was mechanochemically processed (crushed and mixed) using a ball mill (rotation speed: 100 rpm) for the same time as described above. This operation from the scraping to the mechanochemical process (crushing and mixing) was repeated for 700 hours in total. As a result, the inorganic solid electrolyte material ($Li_{10}P_3S_{12}$) in the vitreous state was obtained.

The mechanochemical process (crushing and mixing) was performed in an atmosphere where the abundance and inflow of water and oxygen were suppressed at a higher level.

(4) Annealing 300 g of the inorganic solid electrolyte material in the vitreous state was annealed in argon at 300° C. for 7 hours. As a result, the inorganic solid electrolyte material ($Li_{10}P_3S_{12}$) in the glass ceramic state was obtained.

(5) Sieving

Next, in argon, the obtained inorganic solid electrolyte material in a glass ceramic state was classified through a sieve having a pore size of 20 μm (components that were not able to pass the sieve were removed).

As a result, the inorganic solid electrolyte material was obtained.

Example 2

An inorganic solid electrolyte material in a glass ceramic state was obtained using the same method as that of Example 1, except that the obtained inorganic solid electrolyte material in a vitreous state obtained in (3) was classified through a sieve having a pore size of 20 μm before annealing (that is, in Example 2, the sieving process was performed before and after the annealing process, that is, twice in total).

Example 3

In Example 3, the step (B2) was performed. That is, the inorganic solid electrolyte material in a vitreous state obtained in (3) according to Example 1 was further crushed under appropriate conditions to refine the inorganic solid electrolyte material. The details are as follows.

300 g of the inorganic solid electrolyte material in a vitreous state obtained by (3) crushing and mixing using the ball mill of Example 1 was weighed, was put into an alumina pot (inner volume: 5 L) together with 1200 g of zirconia balls having a diameter of φ 5 mm, 6200 g of zirconia balls having a diameter of φ 2 mm, and 1200 g of zirconia balls having a diameter of φ 1 mm, and was crushed for 50 hours while being vibrated using a ball mill (rotation speed: 100 rpm). As a result, an inorganic solid electrolyte material in a vitreous state was obtained. The inorganic solid electrolyte material in the vitreous state was annealed in argon at 300° C. for 7 hours. As a result, the inorganic solid electrolyte material ($Li_{10}P_3S_{12}$) in the glass ceramic state was obtained.

Next, the obtained inorganic solid electrolyte material in a glass ceramic state was classified through a sieve having a pore size of 20 μm.

As a result, an inorganic solid electrolyte material in a glass ceramic state was obtained.

Comparative Example 1

In Comparative Example 1, the step (B2) was performed, but the conditions thereof were not appropriate. Therefore, particles where $D_{10}$ was 0.54 to 0.80 were not obtained. The details are as follows.

400 g of the inorganic solid electrolyte material in a vitreous state obtained by (3) crushing and mixing using the ball mill of Example 1 was weighed, was put into an alumina pot (inner volume: 5 L) together with 6200 g of zirconia balls having a diameter of φ 2 mm, and was crushed for 120 hours while being vibrated using a ball mill (rotation speed: 100 rpm). As a result, an inorganic solid electrolyte material in a vitreous state was obtained. The inorganic solid electrolyte material in the vitreous state was annealed in argon at 300° C. for 7 hours. As a result, the inorganic solid electrolyte material ($Li_{10}P_3S_{12}$) in the glass ceramic state was obtained.

Next, the obtained inorganic solid electrolyte material in a glass ceramic state was classified through a sieve having a pore size of 20 μm.

As a result, an inorganic solid electrolyte material in a glass ceramic state was obtained.

Comparative Example 2

400 g of the inorganic solid electrolyte material in a vitreous state obtained by (3) crushing and mixing using the ball mill of Example 1 was weighed, was put into an alumina pot (inner volume: 5 L) together with 6200 g of zirconia balls having a diameter of φ 2 mm, and was crushed for 120 hours while being vibrated using a ball mill (rotation speed: 100 rpm). As a result, an inorganic solid electrolyte material in a vitreous state was obtained. The inorganic solid electrolyte material in the vitreous state was annealed in argon at 300° C. for 7 hours. As a result, the inorganic solid electrolyte material ($Li_{10}P_3S_{12}$) in the glass ceramic state was obtained.

Next, the obtained inorganic solid electrolyte material in a glass ceramic state was classified through a sieve having a pore size of 20 μm. The material remaining on "the sieve" was obtained as the final inorganic solid electrolyte material.

Comparative Example 3

An inorganic solid electrolyte material according to Comparative Example 3 was prepared through the following procedures. In Comparative Example 3, an inorganic solid electrolyte material was prepared according to Example 106 of Table 1 in paragraph 0126 of Patent Document 1.

As the raw materials, $Li_2S$ (manufactured by Furukawa Co., Ltd., purity: 99.9%) and $P_2S_5$ (manufactured by Kanto Chemical Co., Inc.) were used.

Next, in an argon glove box, $Li_2S$ powder and $P_2S$, powder, were precisely weighed ($Li_2S:P_2S_5$=75:25 (molar ratio)), and these powders were mixed in an agate mortar for 10 minutes.

Next, 2 g of the mixed powder was weighed, was put into a zirconia pot (inner volume: 45 mL) with 18 zirconia balls having a diameter of φ of 10 mm, and was crushed and mixed (mechanochemical process) using a planetary ball mill (rotation: 800 rpm, revolution: 400 rpm) for 30 hours.

As a result, an inorganic solid electrolyte material ($Li_9P_3S_{12}$) in a vitreous state was obtained.

<Measurement of Circularity of Particles/Calculation of Frequency Distribution of Circularity and Measurement Particle Size of Particles/Calculation of Particle Size Distribution>

Using public image processing software (public freeware, ImageJ, v 1.52a) of National Institutes of Health, a SEM image of the obtained inorganic solid electrolyte material was analyzed. Based on this analysis, the frequency distribution of circularity of particles and the particle size distribution were obtained.

Based on the obtained frequency distribution, $D_{10}$, $D_{50}$, $D_{90}$, and ($D_{90}-D_{10}$)/$D_{50}$ were obtained. In addition, $d_{10}$, $d_{50}$, and $d_{90}$ were obtained from the obtained particle size distribution.

In the procedure, first, a carbon tape is bonded to a sample stage of a SEM, and a small amount of the inorganic solid electrolyte material was bonded to the carbon tape such that the particles thereof were thinly spread out.

Next, a SEM image of the inorganic solid electrolyte material was obtained (was appropriately adjusted at a resolution of 1280×960 pixels and a magnification: 250 to 1000-fold). The obtained SEM image was read by ImageJ. Calibration was performed based on scale displayed in the SEM image. Next, the image was converted into a binary image of black and white. At this time, a threshold was set to clarify contours of the particles. When particles overlap each other in the obtained monochrome image, the separation of the overlapping of the particles was performed using a watershed method as image processing by ImageJ. By performing particle analysis as image analysis by ImageJ, the results of measuring the circularity "Circ." and the results of measuring particle sizes in terms of Feret diameter were obtained.

Finally, the obtained results of measuring the circularity were read by EXCEL (registered trade name) of spreadsheet software by Microsoft Corporation, the circularities were arranged in order from the smallest circularity, and the number of the circularities was counted to obtain the frequency distribution. Likewise, the particle size distribution was obtained from the obtained results of measuring the particle sizes.

Regarding each of Examples and Comparative Examples, a plurality of SEM images were obtained, and the circularity and the particle size of each of 3000 or more particles in total were measured. As a result, the frequency distribution of circularity and the particle size distribution were obtained.

<Evaluation: Measurement of Lithium Ionic Conductivity>

In each of the inorganic solid electrolyte materials obtained in each of Examples and Comparative Examples, the lithium ionic conductivity was measured using an alternating current impedance method.

For the measurement of the lithium ionic conductivity, a potentiostat/galvanostat SP-300 (manufactured by Bio-Logic Sciences Instruments) was used. The size of the sample was diameter: 9.5 mm and thickness: 1.2 to 2.0 mm. Measurement conditions were applied voltage: 10 mV, measurement temperature: 27.0° C., and measurement frequency range: 0.1 Hz to 7 MHz, and electrode: Li foil.

150 mg of the powdery inorganic solid electrolyte material obtained in each of Examples and Comparative Examples was pressed using a press machine at 270 MPa for 10 minutes, and the plate-shaped inorganic solid electrolyte material having a diameter of 9.5 mm and a thickness of 1.2 to 2.0 mm was obtained and used as the sample for the measurement of the lithium ionic conductivity.

Various information is shown in Table 1.

TABLE 1

| Example | Frequency Distribution of Circularity | | | | Particle Size Distribution (μm) | | | Ionic Conductivity |
|---|---|---|---|---|---|---|---|---|
| | $D_{10}$ | $D_{50}$ | $D_{90}$ | ($D_{90}-D_{10}$)/$D_{50}$ | $d_{10}$ | $d_{50}$ | $d_{90}$ | (×10⁻³ S/cm) |
| Example 1 | 0.54 | 0.75 | 0.88 | 0.45 | 1.9 | 4.4 | 9.6 | 1.47 |
| Example 2 | 0.56 | 0.73 | 0.86 | 0.41 | 2.2 | 5.6 | 12.2 | 1.49 |

TABLE 1-continued

| | Frequency Distribution of Circularity | | | | Particle Size Distribution (μm) | | | Ionic Conductivity |
|---|---|---|---|---|---|---|---|---|
| Example | $D_{10}$ | $D_{50}$ | $D_{90}$ | $(D_{90} - D_{10})/D_{50}$ | $d_{10}$ | $d_{50}$ | $d_{90}$ | $(\times 10^{-3} \text{ S/cm})$ |
| Example 3 | 0.68 | 0.83 | 0.92 | 0.29 | 1.0 | 2.2 | 4.0 | 1.54 |
| Comparative Example 1 | 0.47 | 0.74 | 0.87 | 0.54 | 2.2 | 4.0 | 6.6 | 1.19 |
| Comparative Example 2 | 0.51 | 0.7 | 0.83 | 0.46 | 2.6 | 4.8 | 8.6 | 1.38 |
| Comparative Example 3 | 0.54 | 0.7 | 0.84 | 0.43 | 6.4 | 15.2 | 35.6 | 0.57 |

As shown in Table 1, in the inorganic solid electrolyte material (Examples 1 to 3) including the sulfide-based inorganic solid electrolyte particles where $D_{10}$ was 0.54 to 0.80 and $d_{50}$ was 0.1 to 10 μm, the lithium ionic conductivity was relatively high.

On the other hand, in the inorganic solid electrolyte material (Comparative Examples 1 to 3) including the sulfide-based inorganic solid electrolyte particles where $D_{10}$ was less than 0.54 and/or $d_{50}$ was more than 10 μm, the lithium ionic conductivity was lower than that of Examples 1 to 3.

Examples and Comparative Examples were examined.

In Example 3, $d_{50}$ was the smallest among Examples 1 to 3, and the number of particle interfaces increased. Therefore, it is considered that the lithium ionic conductivity was relatively low. However, the lithium ionic conductivity was the highest among Examples 1 to 3. The reason for this is presumed to be that $D_{10}$ of Example 3 was more than those of Examples 1 and 2. That is, it is considered from a comparison between Example 3 and Examples 1 and 2 that the index $D_{10}$ strongly correlates with the lithium ionic conductivity.

In Comparative Examples 1 to 3, the conditions of the ball mill treatment in the crushing step were not appropriate, and the appropriate sieving operation was not performed. Therefore, it is considered that the sulfide-based inorganic solid electrolyte particles where $D_{10}$ was 0.54 to 0.80 and $d_{50}$ was 0.1 to 10 μm were not able to be manufactured. As a result, it is considered that the lithium ionic conductivity was lower than those of Examples 1 to 3.

In particular, it was found from a comparison between Example 1 and Comparative Example 1 that, when the inorganic solid electrolyte material in a vitreous state was "simply finely crushed", the particle size decreased, but the ionic conductivity deteriorated. On the other hand, in Example 3, the crushing process was added to Example 1, in which $d_{50}$ was less than that of Comparative Example 1, but the ionic conductivity was improved. It can be understood from the above results that the index "the 10% cumulative value $D_{10}$ in the frequency distribution of circularity" closely relates with the improvement of ionic conductivity.

The present application claims priority based on Japanese Patent Application No. 2020-197942 filed on Nov. 30, 2020, the entire content of which is incorporated herein by reference.

REFERENCE SIGNS LIST

100: lithium ion battery
101: positive electrode active material layer
103: negative electrode active material layer
105: current collector
110: positive electrode
120: electrolyte layer
130: negative electrode

The invention claimed is:

1. An inorganic solid electrolyte material comprising:
sulfide-based inorganic solid electrolyte particles,
wherein in a frequency distribution of circularity of the particles where the circularity of the particles in the material is plotted on a horizontal axis and a number-based frequency is plotted on a vertical axis, a 10% cumulative value Dio is 0.54 to 0.80, and
a number-based median size $d_{50}$ of the particles in the material is 0.1 to 10 μm,
wherein a 90% cumulative value $D_{90}$ in the frequency distribution is 0.95 or less.

2. The inorganic solid electrolyte material according to claim 1,
wherein a 50% cumulative value $D_{50}$ in the frequency distribution is less than 0.85.

3. The inorganic solid electrolyte material according to claim 1,
wherein when a 50% cumulative value in the frequency distribution is represented by $D_{50}$ and a 90% cumulative value in the frequency distribution is represented by $D_{90}$, a value $(D_{90}-D_{10})/D_{50}$ is 0.10 to 0.45.

4. The inorganic solid electrolyte material according to claim 1, further comprising:
Li, P, and S as constituent elements.

5. The inorganic solid electrolyte material according to claim 4,
wherein a molar ratio Li/P of a content of Li to a content of P in the inorganic solid electrolyte material is 1.0 or higher and 5.0 or lower, and a molar ratio S/P of a content of S to the content of P in the inorganic solid electrolyte material is 2.0 or higher and 6.0 or lower.

6. The inorganic solid electrolyte material according to claim 1,
wherein the inorganic solid electrolyte material is used for a lithium ion battery.

7. A solid electrolyte comprising:
the inorganic solid electrolyte material according to claim 1.

8. A solid electrolyte membrane comprising:
the solid electrolyte according to claim 7 as a main component.

9. The solid electrolyte membrane according to claim 8,
wherein the solid electrolyte membrane is a compact obtained by compression-molding the particle-shaped solid electrolyte.

10. The solid electrolyte membrane according to claim 8,
wherein a content of a binder resin in the solid electrolyte membrane is less than 0.5 mass % with respect to 100 mass % as a total amount of the solid electrolyte membrane.

11. The solid electrolyte membrane according to claim 8, wherein a content of the inorganic solid electrolyte material in the solid electrolyte membrane is 50 mass % or more with respect to 100 mass % as a total amount of the solid electrolyte membrane.

12. A lithium ion battery comprising:

a positive electrode including a positive electrode active material layer;

an electrolyte layer; and a negative electrode including a negative electrode active material layer, wherein at least one of the positive electrode active material layer, the electrolyte layer, and the negative electrode active material layer includes the inorganic solid electrolyte material according to claim 1.

* * * * *